United States Patent [19]

Kurz

[11] 4,067,705

[45] Jan. 10, 1978

[54] APPARATUS FOR HIGH-VOLUME SAMPLING OF GASES AT CONSTANT MASS FLOW RATE

[76] Inventor: Jerome Leigh Kurz, P.O. Box 889, Carmel Valley, Calif. 93924

[21] Appl. No.: 514,197

[22] Filed: Oct. 11, 1974

Related U.S. Application Data

[63] Continuation of Ser. No. 377,951, July 10, 1973, abandoned.

[51] Int. Cl.$^2$ ............................................. B01D 46/00
[52] U.S. Cl. ........................................ 55/210; 55/270; 55/467; 73/421.5 R
[58] Field of Search ..................... 417/43; 55/270, 210, 55/467; 73/421.5 R

[56] References Cited

U.S. PATENT DOCUMENTS

| 2,982,131 | 5/1961 | Rosinski | 73/421.5 R |
|---|---|---|---|
| 3,295,359 | 1/1967 | Peck | 73/28 |
| 3,501,899 | 3/1970 | Allen | 55/210 |
| 3,518,814 | 7/1970 | Maynard | 55/210 |
| 3,528,279 | 9/1970 | Lasseur et al. | 55/270 |
| 3,757,808 | 9/1973 | Peterson et al. | 73/194 M |

FOREIGN PATENT DOCUMENTS

| 282,382 | 3/1928 | United Kingdom | 55/521 |
|---|---|---|---|

Primary Examiner—Bernard Nozick
Attorney, Agent, or Firm—Gary L. Griswold

[57] ABSTRACT

A device for high-volume sampling of gases comprising a filter, means for holding the filter, and means for drawing the gas through the filter and the means for holding the filter wherein a mass flow rate sensing probe is placed in the gas flow path between the filter and the means for drawing the gas through the filter in a location such that the velocity profile of the gas across the area of gas flow where the probe is located is substantially flat and substantially invariant with respect to temperature and pressure changes in the gas, the probe being connected to means for converting a signal from the probe into the changes in the rate at which the means for drawing the gas through said filter operates so that a substantially constant mass flow rate of gas flows through the device.

1 Claim, 3 Drawing Figures

APPARATUS FOR HIGH-VOLUME SAMPLING OF GASES AT CONSTANT MASS FLOW RATE

This is a continuation of application Ser. No. 377,951 filed July 10, 1973, now abandoned.

This invention relates to high-volume sampling of gases. Particularly, this invention relates to controlling the mass flow rate of the gas through the high-volume sampling device.

High-volume sampling of gases to determine the amount of atmospheric particulate matter within such gases is known. The Environmental Protection Agency in *Federal Register*, Volume No. 36, No. 84, Friday, Apr. 30, 1971, pp. 8186–8187 and 8191–8194, discloses the "Reference method for determination of suspended particulates in the atmosphere (high volume method)". A variety of analyses performed in the study of environmental pollution, namely: chemical, radiological, and toxicological analyses, require devices that collect large samples. The high volume sampler of the regulation is adapted to collect large samples. Therefore, it has found wide acceptance.

The reproducibility and accuracy of the average dust concentration determined with the sampler is often overlooked. In the high-volume sampler normally used, the motor/blower has a characteristic performance curve which shows a progressive decrease in the flow rate as a result of sample build-up on the filter. Thus, flow rate is not constant during the sample period. Other variations in the rate of sampling can occur due to line voltage variations in the electrical line leading to the motor, temperature and pressure changes of the gas which significantly alter the pumping rates of the high-volume sampler motor/blower, and motor/blower performance degradation.

It is customary to compute air flow for the entire sampling period by multiplying the average of the initial and final flow rates in cubic feet per minute by the number of minutes of sampling time. Reference conditions specified in the high-volume sampler method of the regulation are 25° C. and 760 mm. of mercury. This means that the volume of gas must be corrected to these conditions in order to determine the standard volume of gas during the sampling period. The computation of the volume of gas during the sampling period is correct only if there is a linear decrease in flow rate and if the ambient density of the air has not significantly varied. Even if one accurately estimates the average flow rate, there can be appreciable error in the computed mean concentration of the particulate per unit volume of air if the actual dust concentration varies significantly in any period of sampling. Thus, if the concentration were higher during the first half of the sampling period than during the second half, the computed mean concentration would be lower than the true concentration during the first half of the period, and vice versa. The error that can develop on account of these reasons is set forth in the regulation at p. 8191 as follows:

"The accuracy with which the sampler measures the true average concentration depends upon the constancy of the airflow rate through the sampler. The airflow rate is affected by the concentration and the nature of the dust in the atmosphere. Under these conditions, the error in a measured average concentration may be in excess of ± 50 percent of the true average concentration, depending upon the amount of reduction of airflow rate and on the variation of the mass concentration of dust with time during the 24-hour sampling period."

Attempts have been made to regulate the high-volume sampler device to maintain air flow constant and therefore be independent of filter loading, temperature and pressure changes and line voltage variations. Such, of course, would improve the accuracy, representativeness and reproducibility of the measurements. The devices which have been utilized in the past have suffered from a number of drawbacks, which include among other things, the use of precision mechanical systems, based upon maintenance of a constant back pressure across an aperture, pressure tap, orifice or a capillary tube. All have been temperature-sensitive and therefore require temperature-regulated enclosures or complicated temperature-compensating devices for proper operation.

Some of the devices use the discharge pressure of the motor/blower as a measure of flow rate. While this is apparently a straightforward solution, such a system introduces another error. As the speed of the blower motor is increased and becomes more and more heavily loaded, heat is generated which increases the temperature of the exhaust air. Thus, the discharge pressure of the motor/blower is increased which causes the control system to change the rate at which it operates. Since this is not in response to a change in the condition of the ambient air but is instead a change caused by the heat of the motor/blower, the changed speed of the motor/blower causes an error in the control of the flow through the device. Attempts have been made to correct this error. One such attempt is found in U.S. Pat. No. 3,501,899, which involves a complicaled constant volume system of control.

It has been found that only by regulating the mass flow rate, as opposed to the volume flow rate, of the gas through the sampler can a truly unique mean dust concentration measurement be made over the sampling period. Mass flow rate is defined as the volume flow rate of the gas referenced to standard conditions, that is, called for by the above-referred-to high-volume sampler method of 25° C. and 760 mm. of mercury, and is most generally referred to as the standard cubic feet per unit time. Since one is controlling via the mass flow rate, the mass flow rate can be set for the entire sampling period, and will not vary significantly from that. In order to calculate the true mean concentration of the particulate matter in the gas, one need only multiply the time of the sampling period times the flow rate and divide this into the net quantity of particulate matter collected on the filter.

The present invention provides a device and method for high-volume sampling of gases which utilizes a mass flow rate sensing probe and control system to drive the motor/blower of the sampler such that the flow rate of the gas is maintained at a constant mass flow rate, that is, at standard volume per unit time, independent of line voltage variations, ambient temperatures, pressure changes, filter loading, and motor/blower performance degradation. The device is for high-volume sampling of gases and comprises a filter, means for holding said filter, and means for drawing said gas through said filter and said means for holding said filter, said means for holding said filter being attached to said means for drawing said gas through said filter. The improvement in the device comprises placing a mass flow rate sensing probe in the gas flow path between said filter and said means for drawing said gas through said filter in a location such that the velocity profile of said gas across the area of gas flow where said probe is located is substantially flat and substantially invariant with respect to temperature and pressure changes in said gas, said probe being connected to means for converting a signal from said probe into changes in the rate at which said means for drawing said gas through said filter operates so that a substantially constant mass flow rate of gas flows through said device. The present invention also includes a method for high-volume sampling of gases which comprises drawing a gas through a filter, continuously measuring the mass flow rate of said gas after it has passed through said filter and controlling the mass flow rate of said gas flowing through said filter using said measurement of said mass flow rate so that a substantially constant mass flow rate of gas continuously flows through said filter. The constant mass flow rate of gas is maintained in spite of such things as filter loading, line voltage variations, temperature and pressure changes, and motor/blower performance degradation.

The present invention is illustrated as to particular preferred embodiments thereof by means of the following drawings, where FIG. 1 is a top view with a partial section of the standard high-volume sampler containing a mass flow rate sensing probe;

FIG. 1 illustrates the top view, while FIG. 2 depicts a side view, of the standard high-volume sampler as set forth in the previously-noted *Federal Register* regulation, with the exception that the sampler now includes the mass flow rate sensing probe of the present invention. Other high-volume sampling configurations are, of course, known and are contemplated by the present invention.

Figure 2:
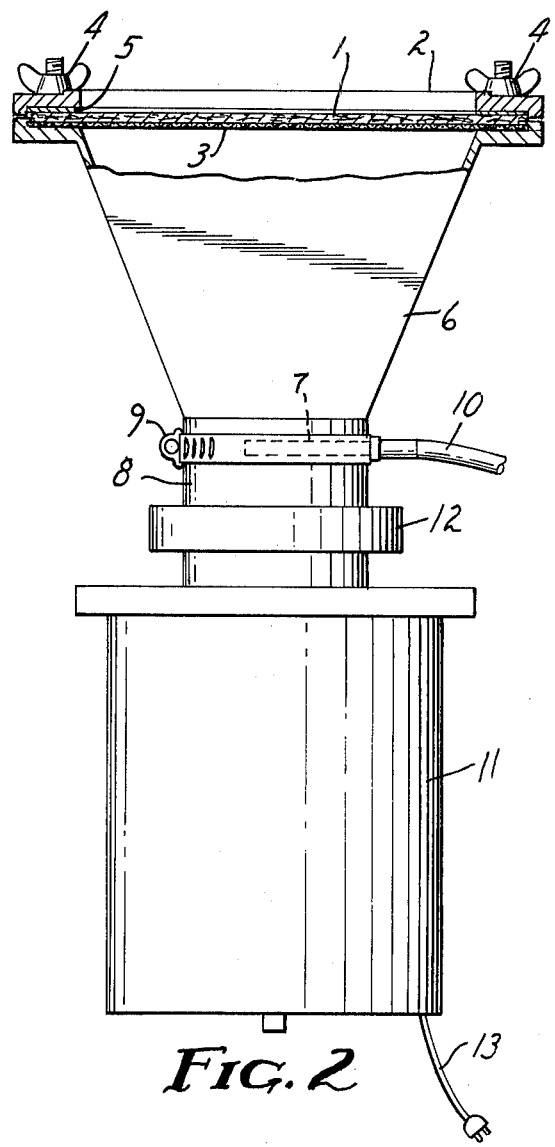
FIG. 2 is a side view with portions in section of the high-volume sampler of FIG. 1.

The filter 1 is sealed with frame 2 against the support screen 3 by using bolts with wing nuts 4 or other means and with gasket 5 (FIG. 2) interposed between the frame 2 and screen 3. Support screen 3 is fastened to converging adaptor 6.

Figure 1:
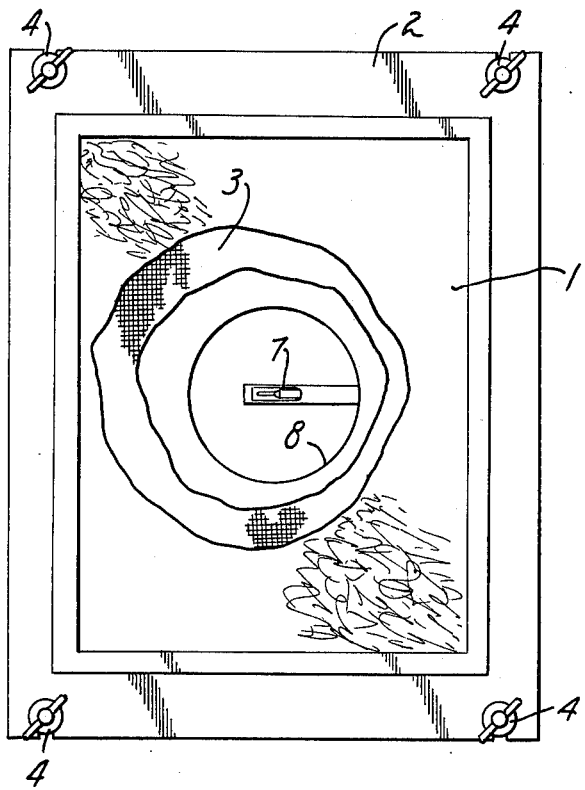

The mass flow rate sensing probe 7 is shown in FIG. 1 in the cut-away portion, and is inserted or protrudes into the sleeve 8 and is securely fastened to the sleeve 8 by clamp 9, which is preferably a worm-gear-type hose clamp. Cable 10 serves to connect the mass flow rate sensing probe 7 to the means for converting a signal from the probe into changes in the rate at which the blower/electric motor device 11 operates. The air blower/electric motor device is fastened to the sleeve 8 by means of a nut 12 or other means. The motor/blower device has an inlet power line 13. It is preferred that the mass flow rate sensing probe 7 be located in sleeve 8, although this is not critical to the invention. The mass flow rate sensing probe 7 can be located anywhere between the filter 1 and the inlet to the air blower/electric motor 11, wherein the velocity profile of the gas is substantially flat and substantially invariant with respect to temperature and pressure changes of the gas. That is, the gas flow profile does not vary to a significant degree with pressure and temperature changes of the gas flowing through the filter, and a local measurement of mass flow rate via probe 7 is a measurement which is representative of the total mass flow rate through the filter and across the area of gas flow where the probe 7 is located. It has been recognized that by placing the mass flow rate sensing probe 7 into the converging means 6 or sleeve 8, the probe is placed in a position where in fact the requisite velocity profile is present. It is believed that primarily the filter 1 and its location relative to the probe allows for such a velocity profile in these sections of the sampling device and allows for an accurate total mass flow rate measurement.

Another configuration for the means for holding the filter is one wherein the means comprises merely a sleeve and a filter holder which is substantially the same size as the sleeve. In this embodiment, the mass flow rate sensing probe is placed in the sleeve.

The mass flow rate sensing probe 7 can use as its sensing element(s) a thermistor, a metal resistor or other element having a reproducible temperature coefficient of resistance. The probe and its electrical circuitry is a thermal anemometer. The thermal anemometer is temperature compensated, that is, its output is not affected by changes in the temperature of the gas under conditions of constant mass flow rate past the sensing element. The thermal anemometer can be operated under various modes including constant temperature, constant current, constant voltage, constant resistance, etc. Preferably the constant temperature mode is used.

In the preferred embodiment, the mass flow rate sensing probe 7 is part of a temperature-compensated, constant temperature thermal anemometer where the velocity sensing portion of the probe is platinum. The platinum is in the shape of a wire and the wire is wrapped around a ceramic substrate. The temperature compensation portion is included in the probe and is of a similar construction. Metals attached to substrates in the form of films, or wires without substrates can also be used. The mass flow rate sensing probe along with its electrical circuitry must produce a unique output, preferably voltage or current, which can be used as a flow sensing input to a controller, which serves to adjust the gas blower/electric motor speed such that the total mass flow rate through the filter is maintained essentially constant at the set point of the controller.

Figure 3:
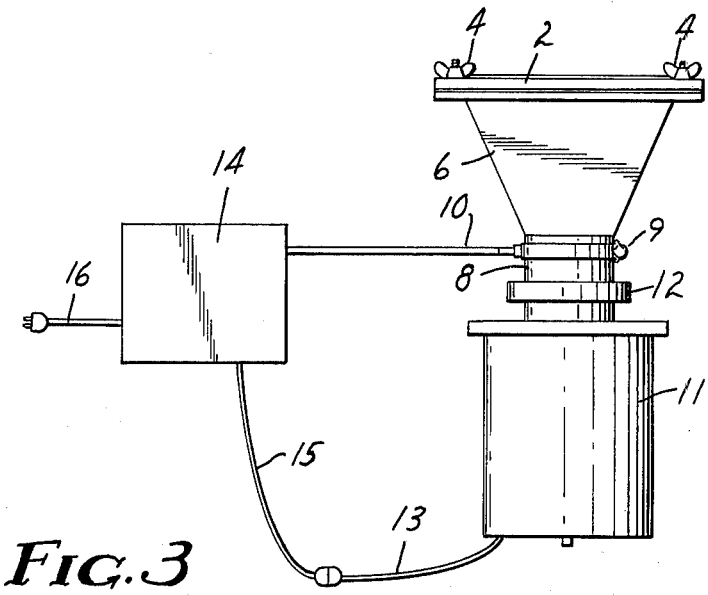
FIG. 3 is a schematic illustration of the preferred embodiment of the high-volume sampler which is constant flow rate controlled.

FIG. 3 is a schematic illustration of the complete flow control system for the high-volume sampler using a mass flow rate sensing probe. Controller 14 accepts the signal through electrical cable 10 from the mass flow rate sensing probe 7, which is fastened to the sleeve 8 by clamp 9, and compares this input to a set point signal representative of the desired operating mass flow rate and adjusts the power to the air blower/electric motor 11 through electrical cables 13 and 15 so that the total mass flow rate through the filter is essentially constant over wide ranges of temperature, pressure, line voltage variation to power line cable 16, and filter resistance due to accumulation of particulate and motor 11 aging. Although many methods of building controllers are known to those skilled in the art, a preferred embodiment of the controller 14 includes a direct-current power supply, reference voltages, circuitry for the thermal anemometer of which mass flow rate sensing probe 7 is a part, an operational amplifier and an optically isolated electronic motor speed control circuit, which uses a solid-state phase cutout device such as a silicon-controlled rectifier or bidirectional silicon-controlled rectifier. In the case of the standard high-volume sampler, the motor is a series wound or universal motor and is capable of being controlled by the above. Other motor speed control circuits can be used with other types of motors as is required.

High-volume sampling is considered to be in a range of from 40 to 60 standard cubic feet per minute of gas per the aforementioned *Federal Register* regulation. The device of the present invention can be operated up to about 60 standard cubic feet per minute, preferably from about 20 to 50 standard cubic feet per minute. The illustrated embodiment allows one to set a mass flow rate, which mass flow rate will be constant over the sampling period and allows one to measure the true mean dust concentration of the sampled gas since the flow rate is continuously referenced to standard conditions and is maintained within an accuracy of ± one standard cubic foot per minute, which is required for the high-volume sampler method given in the above-referenced *Federal Register* regulation. As noted above, the mass flow rate of the present invention is at standard conditions so no corrections are required. No assumption is needed concerning the changes in filter resistance during the sampling period, as was the case previously when it was assumed that there was a straight line or other relationship of the filter resistance over the sampling period, which, as discussed above, could give a substantial error in the mean particulate concentration. No corrections need to be made for temperature or pressure or line voltage changes during the sampling period since the mass flow rate sensing probe and control equipment affect a constant mass flow rate through the filter. Another advantage of this mode of control of the present invention is that the motor/blower 11 operates only at the power necessary to obtain a constant mass flow rate through the filter and not at full speed. Thus, the motor and motor brush life are greatly increased over the normally uncontrolled sampler.

What I claim is:

1. A device for high-volume sampling of gases comprising a filter, a filter holder holding said filter, a converging means attached to said filter holder, a sleeve attached to said converging means and a means for drawing said gas through said filter attached to said sleeve, said converging means converging away from said filter holder and reducing the area for the flow of said gas to that of said sleeve, said filter holder, converging means and sleeve forming a conduit for said gas from said filter to said means for drawing said gas through said filter, the improvement which comprises a mass flow rate sensing probe protruding into said sleeve in a location where the velocity profile of said gas crossing the area of gas flow where said probe is located is substantially flat and substantially invariant with respect to temperature and pressure changes in said gas, said probe being connected to means for converting a signal from said probe into changes in the rate at which said means for drawing said gas through said filter operates, said means for converting a signal being connected to said means for drawing said gas through said filter, whereby a substantially constant mass flow rate of gas flows through said device.

* * * * *